United States Patent
Fossion et al.

(10) Patent No.: US 10,599,593 B2
(45) Date of Patent: Mar. 24, 2020

(54) DEVICE FOR A SPACECRAFT

(71) Applicant: THALES, Courbevoie (FR)

(72) Inventors: Marc Fossion, Ligny (BE); Christophe Maillard, Gesves (BE)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/119,521

(22) Filed: Aug. 31, 2018

(65) Prior Publication Data

US 2019/0073325 A1 Mar. 7, 2019

(30) Foreign Application Priority Data

Sep. 5, 2017 (EP) .................................... 17306147

(51) Int. Cl.
*G06F 3/00* (2006.01)
*G06F 13/20* (2006.01)
(Continued)

(52) U.S. Cl.
CPC ............. *G06F 13/20* (2013.01); *B64G 1/428* (2013.01); *B64G 1/546* (2013.01); *B64G 1/66* (2013.01);
(Continued)

(58) Field of Classification Search
CPC ......... G06F 13/20; G06F 13/00; B64G 1/428; B64G 1/66; G05B 19/0425; G05B 19/0428; H02J 4/00; G04L 63/029
(Continued)

(56) References Cited

U.S. PATENT DOCUMENTS 4,106,076 A * 8/1978 Miller .................. H05K 7/1457
361/678
7,020,076 B1 * 3/2006 Alkalai ..................... H04L 1/22
370/217
(Continued)

FOREIGN PATENT DOCUMENTS

EP 2 648 300 A1 10/2013

OTHER PUBLICATIONS

Gleeson, et al., "The Smart Backplane—Lowering the Cost of Spacecraft Avionics by Improving the Radiation Tolerance of Cots Electronic Systems", 33rd Space Symposium, Technical Track, Colorado Springs, Apr. 3, 2017, XP055456104.

*Primary Examiner* — Tim T Vo
*Assistant Examiner* — Kim T Huynh
(74) *Attorney, Agent, or Firm* — Baker & Hostetler LLP

(57) ABSTRACT

A device for a spacecraft includes electronic boards; elements that are robust to radiation, i.e. that have a foreseeable failure rate that is lower than a threshold called acceptable threshold, comprising: a shared bus for exchanging electric power between electronic boards; a shared bus for exchanging data between the electronic boards; a module for managing the inputs/outputs and for telemetry gathering, per electronic board; an electrical level interface between an electronic board and the shared data exchange bus, per electronic board; wherein at least one electronic board comprises: a part equipped with COTS components whose failure rate is unforeseeable or greater than or equal to the acceptable threshold; and a firewall formed of components that are robust to radiation and whose failure rate is foreseeable and lower than the acceptable threshold, comprising a module for monitoring and protecting the power flows of the shared power exchange bus and a module for monitoring and protecting the inputs/outputs in order to manage the (Continued)

power supply and the communication of the components of the electronic board.

8 Claims, 2 Drawing Sheets

(51) Int. Cl.
<table>
<tr><td>G05B 19/042</td><td>(2006.01)</td></tr>
<tr><td>B64G 1/54</td><td>(2006.01)</td></tr>
<tr><td>B64G 1/42</td><td>(2006.01)</td></tr>
<tr><td>B64G 1/66</td><td>(2006.01)</td></tr>
<tr><td>H02J 4/00</td><td>(2006.01)</td></tr>
<tr><td>H04L 29/06</td><td>(2006.01)</td></tr>
</table>

(52) U.S. Cl.
CPC ..... *G05B 19/0425* (2013.01); *G05B 19/0428* (2013.01); *H02J 4/00* (2013.01); *H04L 63/029* (2013.01)

(58) Field of Classification Search
USPC ......... 710/18, 52, 305–306; 701/3; 361/752; 714/43
See application file for complete search history.

(56) References Cited

U.S. PATENT DOCUMENTS

2012/0197447 A1\* 8/2012 Fossion .............. G05B 19/0428
700/286
2014/0039729 A1 2/2014 Puig-Suari et al.

\* cited by examiner

DEVICE FOR A SPACECRAFT

CROSS-REFERENCE TO RELATED APPLICATIONS

This application claims priority to foreign European patent application No. EP 17306147.4, filed on Sep. 5, 2017, the disclosure of which is incorporated by reference in its entirety.

FIELD OF THE INVENTION

The invention relates to a device for a spacecraft.

BACKGROUND

In the space sector, use is generally made of numerous electronic components said to be radiation-hardened, or in other words that have a failure rate due to radiation that is completely foreseeable and lower than a threshold, called acceptable threshold, which is generally ten times lower than the fault rate.

Failure rate due to radiation that is completely foreseeable is understood to mean a failure rate that is able to be proven by tests and calculations.

The cost of these components that are specifically designed to be robust or hardened to the effects of radiation is very high, and it is thus increasingly being contemplated to use COTS or 'commercial off the shelf' components with a significantly lower cost. These components that are not specifically designed to operate in the presence of radiation originate from pre-existing land vehicle or military applications, hence the name COTS. They are characterized by a failure rate due to radiation that is unforeseeable or greater than the acceptable threshold. Specifically, an increasingly large amount of pressure is being placed on recurring costs of space devices, and particularly for components used to implement applications implemented by constellations of satellites.

For electronic components that are present in a large number, it is therefore highly beneficial in an economic sense to use COTS components while subjecting them to an array of additional tests.

The active electronic components (allowing the power of a signal to be increased) known as COTS are not designed for the purpose of withstanding the effects of ionizing radiation, while the majority of passive electronic components known as COTS (not allowing the power of a signal to be increased) are capable of resisting high-radiation space environments.

SUMMARY OF THE INVENTION

The present invention aims to mitigate the abovementioned drawbacks, and in particular the problem of tolerance to failures without impacting the performance of the spacecraft, while at the same time using components known as COTS, significantly limiting production costs.

According to one aspect of the invention, what is proposed is a device for a spacecraft comprising:
electronic boards
  elements that are robust to radiation, i.e. that have a foreseeable failure rate that is lower than a threshold called acceptable threshold, comprising:
    a shared bus for exchanging electric power between electronic boards;
    a shared bus for exchanging data between the electronic boards;
    a module for managing the inputs/outputs and for telemetry gathering, per electronic board;
    an electrical level interface between an electronic board and the shared data exchange bus, per electronic board;
  wherein at least one electronic board comprises:
    a part equipped with COTS components whose failure rate is unforeseeable or greater than or equal to the acceptable threshold; and
    a firewall formed of components that are robust to radiation and whose failure rate is foreseeable and lower than the acceptable threshold, comprising a module for monitoring and protecting the power flows of the shared power exchange bus and a module for monitoring and protecting the inputs/outputs in order to manage the power supply and the communication of the components of the electronic board.

Such a device makes it possible to be able to manage the problem of tolerance to faults without impacting performance, while using components known as COTS, significantly limiting production costs.

In one embodiment, the shared electric power exchange bus is redundant.

Thus, in the event of a fault with the shared electric power exchange bus, the redundant shared electric power exchange bus takes over.

According to one embodiment, the shared data exchange bus is redundant.

Thus, in the event of a fault with the shared data exchange bus, the redundant shared data exchange bus takes over.

In one embodiment, the device comprises an on-board computer equipped with a calculator part, with a communication management part and with a redundancy and reconfiguration management part, the calculator part comprising COTS components whose failure rate is unforeseeable or greater than or equal to the acceptable threshold, and the communication management and redundancy and reconfiguration management parts being formed of components that are robust to radiation and whose failure rate is foreseeable and lower than the acceptable threshold.

The number of radiation-hardened components, and therefore the cost of the device, is thus limited. The performance (increase in available calculating power and reduction of electricity consumption) is improved.

In one embodiment, the acceptable threshold is ten times lower than the intrinsic fault rate of the components.

According to another aspect of the invention, what is also proposed is a spacecraft equipped with a device such as described above.

BRIEF DESCRIPTION OF THE DRAWINGS

The invention will be better understood on studying a few embodiments described by way of completely non-limiting example and illustrated by the appended drawings, in which.

In the various figures, elements that have identical references are identical.

DETAILED DESCRIPTION

Figure 1:
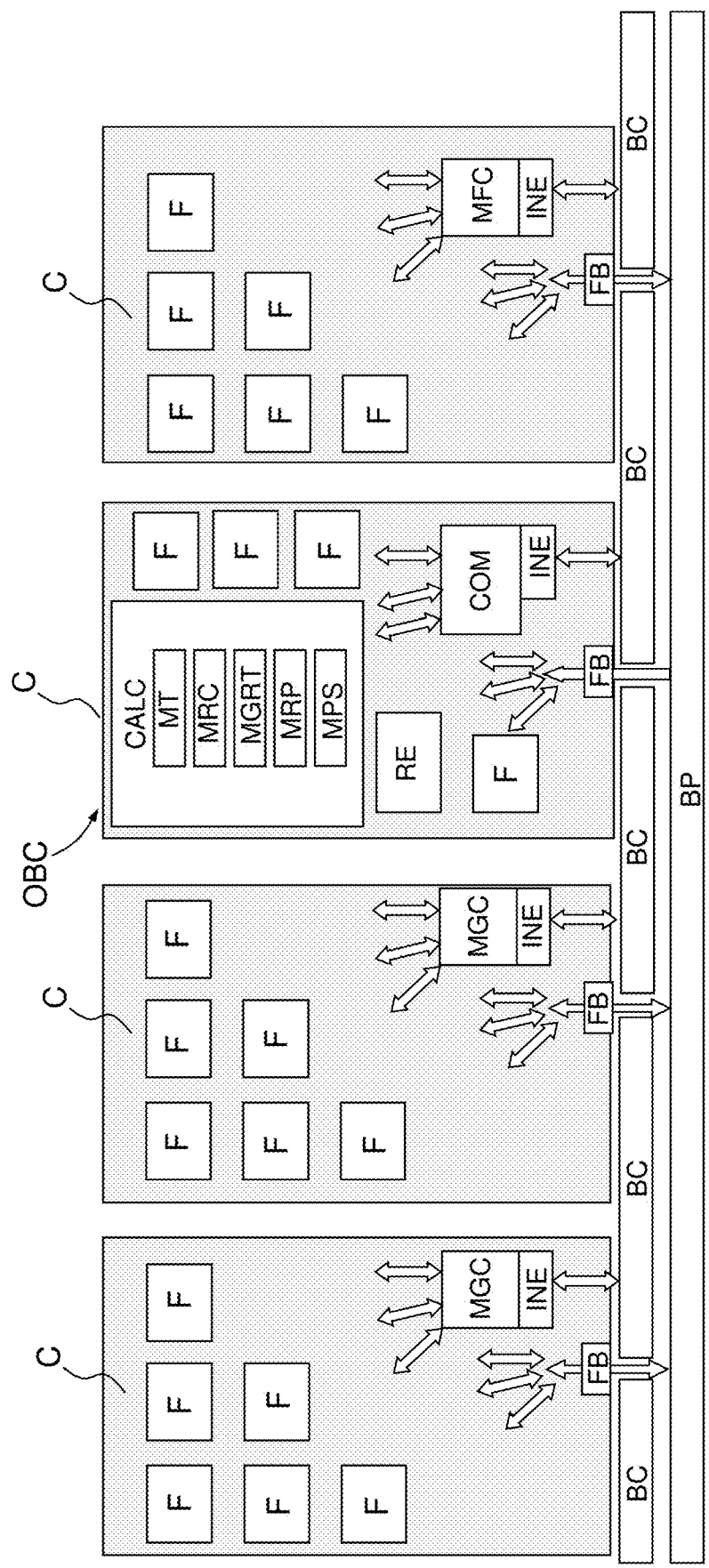
FIG. 1 schematically illustrates a device for a spacecraft according to the prior art.

In FIG. 1, a device from the prior art comprises a plurality of electronic boards C, four electronic boards in this case, all comprising exclusively radiation-hardened components, i.e. that have a fault rate that is foreseeable and lower than a threshold.

All of them comprise components that perform various conventional avionic functions F.

The device also comprises a shared bus BP for exchanging electric power between the electronic boards C, and a shared bus BC for exchanging data between the electronic boards C.

The buses BP and BC are generally redundant, so as to take over in the event of a fault.

One of the electronic boards C comprises the components that form the on-board computer OBC. The on-board computer OBC comprises a calculator part CALC, a communication management part COM, and a redundancy and reconfiguration management part RE.

The calculator part CALC comprises, as is conventional, a trajectography module MT, a module MRC for regulating the loading of the batteries of the spacecraft, a thermal regulation management module MGRT, a GNSS positioning receiver module MRP, and a stellar pointer module MPS.

A fuse FB is positioned between the shared electric power exchange bus BP and each electronic board C in order to disconnect an electronic board C that may be defective from the shared electric power exchange bus BP, so as not to propagate this defect.

Each electronic board C comprises an electrical level interface INE between the board and the shared data exchange bus, per electronic board C. This interface INE makes it possible to adjust the electrical levels, which are generally different on the electronic board and on the shared data exchange bus BC (such as a CAN transceiver).

Furthermore, each electronic board C, except for the board comprising the on-board computer OBC, comprises a module MGC for remotely managing the inputs/outputs and for telemetry gathering. The board comprising the on-board computer OBC does not comprise a module MGC for managing the inputs/outputs and for telemetry gathering, as it is this module that pools the information coming from the other electronic boards. By contrast, it has to ensure the management and the correct operation of the shared data exchange bus BC.

Such a device is expensive, as it requires the use of electronic boards equipped exclusively with components that are robust to radiation and radiation-hardened.

Figure 2:
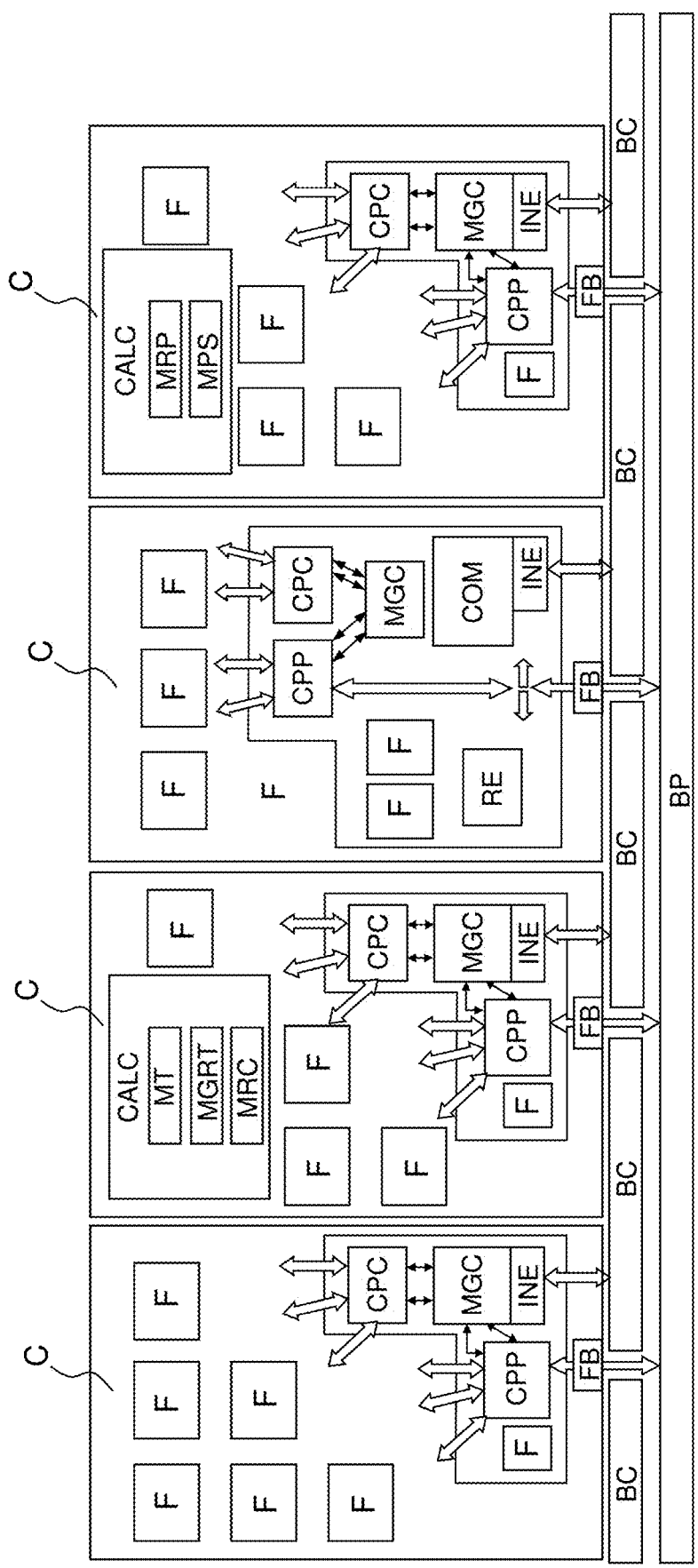
FIG. 2 schematically illustrates a device for a spacecraft according to one aspect of the invention.

FIG. 2 shows a device for a spacecraft according to one aspect of the invention.

The device comprises electronic boards C, four electronic boards in this case, comprising radiation-hardened components and non-radiation-hardened components.

All of them comprise components that perform various conventional avionic functions F.

The device also comprises a shared bus BP for exchanging electric power between the electronic boards C, and a shared bus BC for exchanging data between the electronic boards C.

The buses BP and BC are generally redundant, so as to take over in the event of a fault.

The electronic boards C comprise the components that form the on-board computer OBC. The on-board computer OBC comprises a calculator part CALC, a communication management part COM, and a redundancy and reconfiguration management part RE.

The communication management part COM and the redundancy and reconfiguration management part RE are formed of elements that are robust to radiation or radiation-hardened, and the calculator part CALC comprises components that are not robust to radiation.

The calculator part CALC comprises, as is conventional, a trajectography module MT, a module MRC for regulating the loading of the batteries of the spacecraft, a thermal regulation management module MGRT, a GNSS positioning receiver module MRP, and a stellar pointer module MPS. These modules of the calculator part CALC may be distributed over various electronic boards C, for example over two electronic boards in the present example.

A fuse FB is positioned between the shared electric power exchange bus BP and each electronic board C in order to disconnect a defective electronic board C from the shared electric power exchange bus BP and avoid propagating this defect.

Each electronic board C comprises an electrical level interface INE between the board and the shared data exchange bus, per electronic board C. This interface INE makes it possible to adjust the electrical levels, which are generally different on the electronic board C and on the shared data exchange bus BC (such as a CAN transceiver).

Furthermore, each electronic board C comprises a module MGC for managing the inputs/outputs and for telemetry gathering.

The modules MGC are formed of components that are robust to radiation.

All of the electronic boards C therefore comprise a module MGC for managing the inputs/outputs and for telemetry gathering, remotely or not remotely.

Each electronic board C comprises a firewall formed of components that are robust to radiation, comprising a module CPP for monitoring and protecting the power flows of the shared power exchange bus and a module CPC for monitoring and protecting the inputs/outputs in order to manage the power supply and the communication of the components of the electronic board.

A module CPP for monitoring and protecting the power flows of the shared power exchange bus makes it possible to control and monitor power consumption dynamically and to check that it actually corresponds to the tasks being executed by the electronic components present on the electronic board. In the event of a mismatch, the occurrence of a failure due to radiation is concluded therefrom.

A module CPC for monitoring and protecting the inputs/outputs in order to manage the power supply and the communication of the components of the electronic board makes it possible to control and monitor the flows of information that enter and leave electronic boards C. In the event of an abnormally high or low volume of traffic, or if the content is abnormal/incoherent, the occurrence of a failure due to radiation is concluded therefrom.

It is therefore possible to furnish a spacecraft equipped with a device as described above.

Such a device therefore makes it possible to use non-radiation-hardened components in spacecraft, thereby making it possible to use off the shelf components that are far more powerful or efficient than those that are conventionally radiation-hardened, and to drastically reduce the cost of such a device, while at the same time complying with the constraints in terms of availability of the service provided by aerospace devices.

The invention claimed is:

1. A device for a spacecraft comprising:
   electronic boards;

elements that are robust to radiation, wherein the robustness indicates a foreseeable failure rate that is lower than a threshold called acceptable threshold, comprising:
- a shared bus for exchanging electric power between electronic boards;
- a shared bus for exchanging data between the electronic boards;
- a module for managing the inputs/outputs and for telemetry gathering, per electronic board; and
- an electrical level interface between an electronic board and the shared data exchange bus, per electronic board;

wherein at least one electronic board comprises:
- a part equipped with commercial-off-the-shelf (COTS) components whose failure rate is unforeseeable or greater than or equal to the acceptable threshold; and
- a firewall formed of components that are robust to radiation and whose failure rate is foreseeable and lower than the acceptable threshold, comprising a module for monitoring and protecting the power flows of the shared power exchange bus and a module for monitoring and protecting the inputs/outputs in order to manage the power supply and the communication of the components of the at least one electronic board.

2. The device according to claim 1, wherein the shared electric power exchange bus is redundant.

3. The device according to claim 1, wherein the shared data exchange bus is redundant.

4. The device according to claim 1, comprising an on-board computer equipped with a calculator part, with a communication management part and with a redundancy and reconfiguration management part, the calculator part comprising COTS components whose failure rate is unforeseeable or greater than or equal to the acceptable threshold, and the communication management and redundancy and reconfiguration management parts being formed of components that are robust to radiation and whose fault rate is foreseeable and lower than the acceptable threshold.

5. The device according to claim 1, wherein the threshold is ten times lower than the intrinsic fault rate of the components.

6. A spacecraft equipped with a device according to claim 1.

7. The device according to claim 1, wherein the COTS components are communicably located behind the firewall.

8. The device according to claim 1, wherein the firewall protects against propagation of a failure originating from the COTS components.

* * * * *